Aug. 13, 1929.                J. H. GODFREY                1,724,017
                                  VALVE
                           Filed May 28, 1927          2 Sheets-Sheet 2
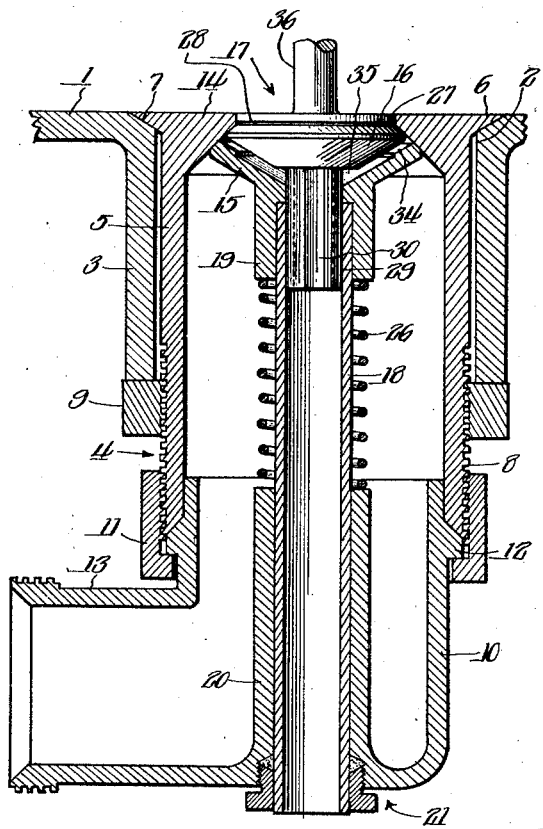
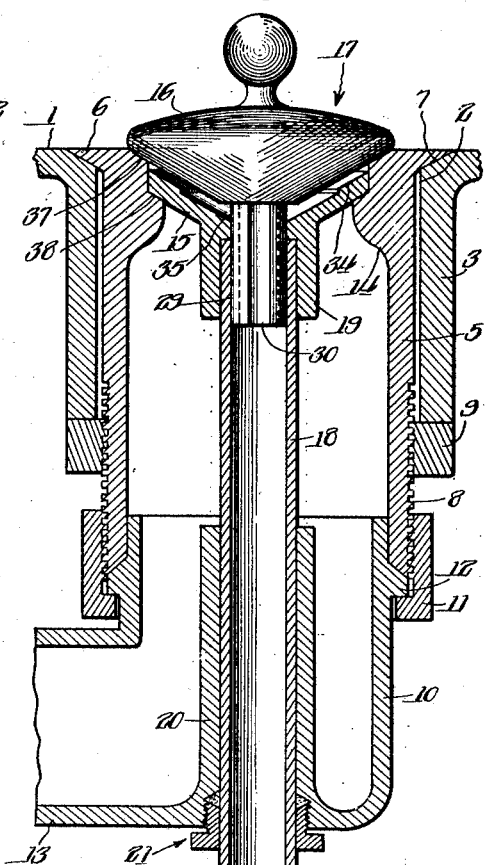
Inventor:-
Joseph H. Godfrey,
By Churchill Parker Railson
                  Attys.

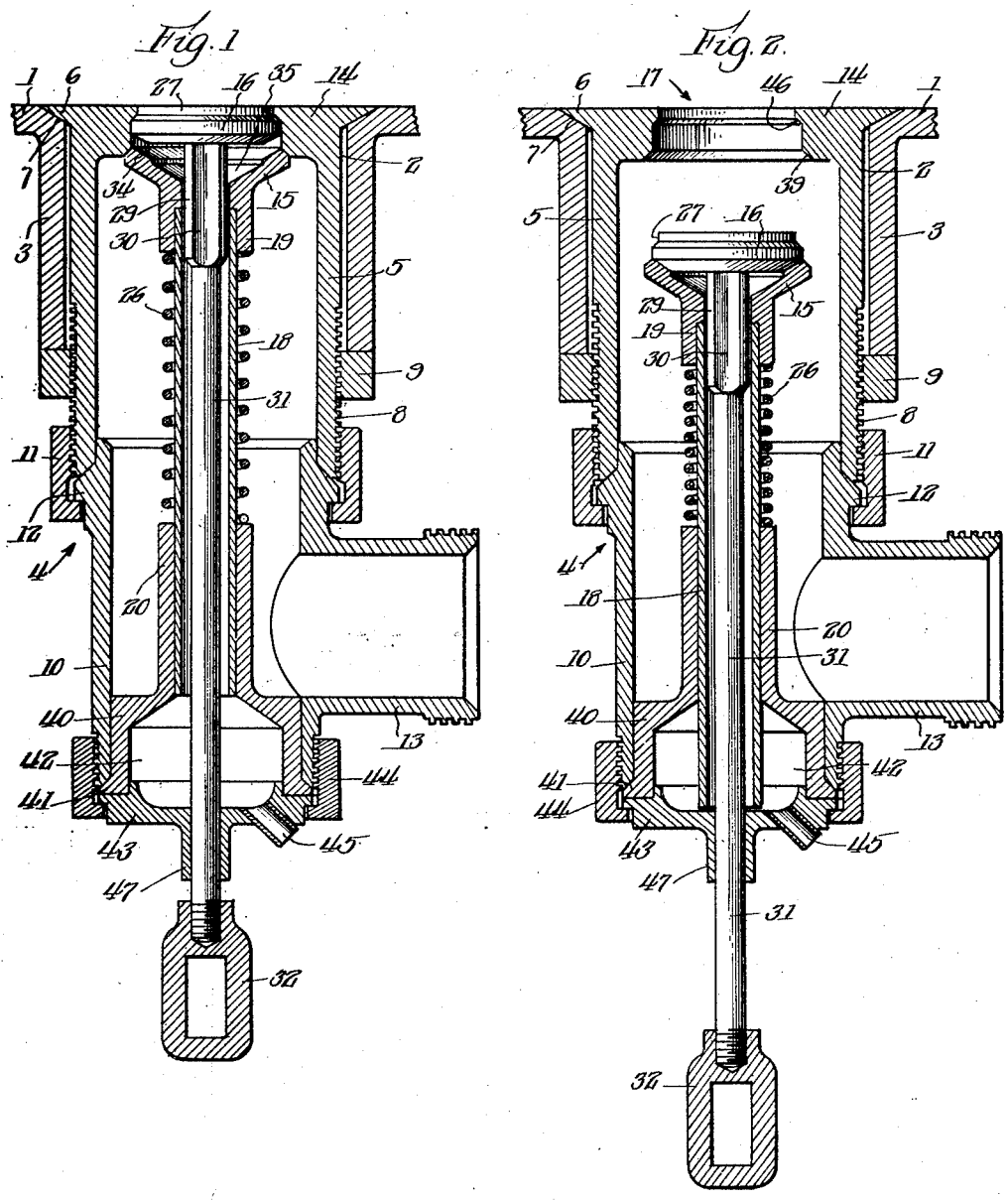

Patented Aug. 13, 1929.

1,724,017

UNITED STATES PATENT OFFICE.

JOSEPH H. GODFREY, OF CHICAGO, ILLINOIS, ASSIGNOR TO THE CREAMERY PACKAGE MFG. COMPANY, OF CHICAGO, ILLINOIS, A CORPORATION OF ILLINOIS.

VALVE.

Application filed May 28, 1927. Serial No. 194,988.

The invention relates to valves for the control of edible fluids commonly known as sanitary valves.

In milk pasteurization, one of the commonly practiced methods is to hold quantities of the milk at a predetermined temperature for a predetermined time in suitable containers, the containers being filled and emptied through piping controlled by sanitary valves. It will be obvious that any leakage or failure in these valves will permit the uncontrolled flow to or from the container of a quantity of milk which has not been held for the required time at the necessary temperature. If such leakage is permitted to pass through the apparatus with the properly pasteurized milk the latter is in danger of reinoculation by the undestroyed bacteria in the milk which has escaped the prescribed treatment.

It is the principal object of this invention to provide an improved sanitary valve for controlling the filling and emptying of pasteurizing holders, which is constructed to intercept and direct outwardly from the main passages any leakage occurring in the valve when it is in closed position.

A further object is to provide a leakage diverting valve structure in which the controlling valve members are closely associated in an arrangement which does not trap within the structure a quantity of the milk or other liquid with the closing operation of the valve, thus eliminating the waste of the milk otherwise trapped and discharged through the leakage diverting passage.

A further object is to provide a leakage diverting valve structure in which any leakage is conducted away from between the controlling valves through a portion of the operating supports for the valves, thus simplifying construction and avoiding a multiplicity of openings in the valve casing.

Other objects and advantages will be apparent in the following detailed description of a preferred embodiment of the invention which I have selected for illustration in the accompanying drawings. It will be understood, however, that various changes in form, construction and arrangement may be made by those skilled in the art without departing from the scope and spirit of the invention as expressed in the appended claims.

Referring to the drawings, Figure 1 is a sectional elevation of the preferred form of the valve structure in closed position.

Fig. 2 is a sectional elevation of the preferred form of the structure with the operating parts in open position.

Fig. 3 is a sectional elevation of a modified form of the valve structure.

Fig. 4 is a sectional elevation of another modified form of the valve structure more particularly adapted for use as an outlet valve.

The preferred construction herein disclosed is especially adapted to use as an inlet valve in controlling an inlet opening in the lower wall of a holding container, in which case the elimination of trapped liquid is of especial advantage. However, the construction as illustrated is well adapted to the control of an outlet opening from a holding container. For clarity of statement, the following description and the claims treat of the valve in each of the forms herein illustrated as an inlet valve, it being understood that the terms inlet and outlet are interchangeable as applied therein to the main openings of the valve structure.

The reference numeral 1 indicates the bottom wall of a liquid holding container having an inlet opening 2 preferably formed with an outwardly extending integral sleeve 3 adapted for the support of a valve structure. A sectional valve casing 4 comprises an upper section 5 freely positioned within the sleeve 3 and provided with a radial end flange 6 bearing upon a suitable seat 7 at the margin of the inlet opening 2, preferably in such manner as to position the end face of the casing flush with the inner wall of the container. The lower end of the section 5 of the casing preferably is screw threaded, as at 8, the threaded portion carrying a ring nut 9 bearing upon the end of the sleeve 3, thereby securing the upper section 5 of the casing rigidly in position in the wall of the container.

A lower section 10 of the casing is preferably attached to the upper section 5 by means of a union joint, the two sections being secured together by a union nut 11 threaded upon the lower end of the upper section 5 and having a conventional bearing upon a flange 12 of the lower section. The lower section 10 is provided with an inlet opening preferably formed through a laterally extending nipple 13 having its end arranged in suitable form for conventional union connection with a sanitary pipe line.

The upper section 5 of the casing is provided with an annular shoulder 14 preferably positioned immediately adjacent the upper end of the casing and describing the outlet opening from the valve casing to the container. The shoulder 14 is arranged to form a seat or seats for a pair of valves 15 and 16 controlling the outlet opening 17 from the valve casing. The lower one 15 of the two valves is preferably of conical or funnel shape with its wider portion upward and seating at its upper outer edge upon the shoulder 14 to close the outlet opening 17. In the preferred form illustrated in Figs. 1 and 2, the shoulder 14 is shaped to provide a seat 39, at the lower margin of the shoulder, for the lower valve 15.

The lower valve 15 is operatively supported upon a tubular stem 18 secured at one end in an axial tubular extension 19 of the valve and having a sliding bearing in a tubular boss 20 which may be formed integrally with the lower section of the casing within the valve chamber, as illustrated in the modified forms shown in Figs. 3 and 4. In the latter modified forms, the tubular stem 18 extends outwardly of the casing, the latter preferably being provided with a conventional packing gland 21 positioned at the outer end of the opening through the boss 20.

In the preferred form illustrated in Figs. 1 and 2, the stem supporting boss 20 is formed integrally with an end closure plug 40 removably fitted in the lower end of the casing section 10 and having a flange 41 in postioning abutment with the end of the casing. The plug 40 is preferably provided with an outwardly opening chamber 42 having a removable closure plate 43 seated upon the end of the plug 40, the plate 43 and plug 40 being secured to the casing 10 by means of a bearing flanged ring nut 44 having screw threaded engagement with the casing.

The tubular stem 18 extends through the boss 20 into communication with the chamber 42. The upper surface of the plate 43 is preferably cup shaped, and is provided with a nipple 45 adapted to drain the chamber 42.

In the modified forms, the tubular stem 18 may be open at its outer end as in Fig. 3, or may be provided, as shown in Fig. 4, with lateral openings 22 with an end closure 23 positioned in the stem and supporting a cup shaped receptacle 24 having a discharge nipple 25 provided in the lower portion thereof.

The valve 15 preferably is normally retained in closed relation to its seat by means of a coiled spring 26 positioned under compression around the tubular stem 18 and bearing at its respective ends upon the valve extension 19 and the upper end of the bearing boss 20.

The upper valve 16, of the pair of valves controlling the casing outlet opening, is preferably formed also with a conical outer periphery adjacent to the inner face of the lower valve 15, and is suitably formed on its upper face to be seated in engagement with the shoulder 14 to effect a double closure of the opening 17. In the preferred form shown in Figs. 1 and 2, the center portion of the valve 16 is cylindrical and slidable within the cylindrical center portion of the shoulder 14, the valve being tapered inwardly from the upper margin of the cylindrical portion suitably for engagement with the tapered seat 46 provided adjacent the upper margin of the shoulder 14.

The upper face of the upper valve 16 also is preferably provided with an extended portion 27 proportioned to slidably fit within the opening 17 and to extend flush with the end face of the valve casing. If desired, an annular peripheral channel 28 may be provided at the juncture of the lateral periphery of the portion 27 with the seat engaging face of the valve 16, as shown in the modified form illustrated in Fig. 3, to avoid accumulations at the angle of the two surfaces which might prevent the accurate seating of the valves.

The upper valve 16 is operatively supported upon a stem 29 extending operatively through an axial opening in the lower valve 15 in continuation of the inside diameter of the tubular stem 18 supporting the lower valve. The upper valve stem 29 serves also as a guide for the positioning in operation of the upper valve in relation to its complementary lower valve, the stem 29 being axially slidable in its bearing. The stem 29 is also provided with longitudinal channels 30 which open communication from the space between the two valves into the interior of the tubular stem 18.

In the preferred construction, the upper valve 16 and its supporting stem 29 are operatively carried upon a rod 31 secured to the stem and extending outwardly through the tubular stem 18 in spaced relation to the latter to provide an annular passage therethrough. The rod 31 extends substantially beyond the end of the tubular stem 18 and outwardly through a suitable bearing 47 provided in the end closure plate 43, for connection with suitable valve operating mechanism of any desired arrangement, that herein illustrated comprising a yoke 32 suitably secured to the end of the rod and in pivotal connection with an operating lever 33 (see Fig. 4) which may be actuated in any suitable manner.

In the operation of the valve structure, assuming the valves to be in closed position, the rod 31 is drawn downwardly to open the valves. The first movement of the upper valve 16 causes it to close the space between the two valves and to be seated on its lower surface upon the upper inner surface of the lower valve 15. The latter is preferably provided, adjacent the margin of its upper face, with a raised portion forming a seat 34 for engagement by the upper valve in the opening movement. The further withdrawal of the rod 31 and the upper valve 16 causes the lower valve 15 to leave its seat and be drawn downward against the tension of the spring 26 with its supporting tubular stem 18 sliding axially through the bearing boss 20 for a suitable distance to provide a full opening of the inlet 17. The valves are closed by the reverse movement of the rod 31 whereby the upper valve 16 is raised into engagement with its seat and the lower valve is elevated to seated position by the spring 26.

With both valves seated there exists between them a substantial space 35 which is closed at its margin by the annular shoulder 14 of the casing, and which is open at the center of the downwardly tapering upper surface of the lower valve, through the channels 30 in the upper valve stem, into the interior of the tubular stem 18. In this position of the valve members, it will be obvious that any leakage which may occur by reason of the imperfect seating of either valve will be stopped by the other valve and such leakage caused to flow through the space 35 and the axial opening or auxiliary passage through the valve 15 into the tubular stem 18 and outwardly into the chamber 42 from which it will be drained through the nipple 45, or, as in the modified arrangement shown in Fig. 4, into the cup 24, and thus be conducted out of the normal passage through the valve casing. By this diversion all such leakage is prevented from being intermixed with the body of the liquid under normal control in the valve passage and in the holding container. When such leakage does occur, it is immediately apparent by the drip discharged through the nipple 45.

In the modified structure illustrated in Fig. 3 the rod 31 is removed from the lower end of the supporting stem 29 of the upper valve, and is attached, as at 36, to the upper face of the upper valve, thus enabling the operation of the valves from above rather than below.

In the modified structure illustrated in Fig. 4 the operating rod 31 is dispensed with, and the upper valve 16 is seated by gravity and the weight of the liquid in the holding container. In this construction the operation of the valve members is effected by connection of the yoke 32 to the lower end of the tubular stem 18, by which latter the lower valve is raised from its seat into engagement with the under surface of the upper valve and by the further movement lifting both valves from their seats to clear the opening 17, the upper valve being retained in its relative position by means of the guiding stem 29 and the weight of the upper valve resting upon its lower complementary member. It will be noted in this modified construction that the casing shoulder 14 is formed with its seats 37 and 38 for the respective valve members facing toward the holding container rather than toward the inner chamber of the valve casing, and that the valve members are moved upwardly and outwardly of the casing to open the passage through the structure.

It will here be apparent that I have provided a valve structure comprising two closely associated cooperating valve members which are slightly separated when in seated position to provide between them a leakage receiving and diverting space, but which are immediately engaged to close the leakage diverting space with the first movement in opening the valves. By this arrangement there is no milk trapped between the two valves in their operating movements to be wasted through the leakage diverting passage when the valves are moved into closed position.

I claim as my invention:

1. A device of the class described, comprising a casing having a passage and a pair of valves adapted to control said passage, said valves being spaced apart when in closed position, a tubular stem supporting one of said valves and having communication with the space between said valves, one end of said tubular stem opening outwardly of said passage, the other of said valves having a stem extending into said tubular stem of the first mentioned valve.

2. A device of the class described, comprising a casing having a passage and a pair of valves adapted to control said passage, said valves being spaced apart when in closed position, a tubular stem supporting one of said valves and having open communication with the space between said valves, one end of said tubular stem opening outwardly of the passage of said casing, the other of said valves having a stem extending into said tubular stem of the first mentioned valve, and means for operating said valves connected to one of said stems.

3. A device of the class described having a passage, a pair of valves adapted to control said passage, said valves being spaced apart when in closed position, one of said valves having an auxiliary passage opening from the space between said valves, and a pair of telescoping stems respectively supporting said valves and effecting communication from said auxiliary passage outwardly of said first mentioned passage.

4. A device of the class described comprising a casing having a passage, a pair of valves adapted to control said passage, said valves being in spaced relation when in closed position and being in abutting relation when in open position, and a pair of telescopically arranged members operatively supporting said valves and providing an auxiliary passage from the space between said valves extending outwardly of said casing, said auxiliary passage being closed when said valves are in abutting relation.

5. A device of the class described having a passage, a pair of coaxially reciprocatory valves adapted to control said passage, said valves being in spaced relation when in closed position, means including a tubular stem tending to maintain one of said valves in closed position, means operable through said stem for opening and closing the other of said valves, said operating means effecting the abutment of said other valve, in the opening movement thereof, with said first mentioned valve to open both of said valves.

6. A device of the class described having a passage, a pair of coaxially reciprocatory valves adapted to control said passage, said valves being in spaced relation when in closed position and in abutting relation when in open position, a tubular stem supporting one of said valves and providing an auxiliary passage from the space between said valves outwardly of said first mentioned passage, another stem supporting the other of said valves and extending into said tubular stem, and a seat formed on one of said valves for engagement by the other of said valves to close said auxiliary passage when said valves are in abutting relation.

7. A device of the class described, comprising a casing having a passage, valve seats provided in said passage, a valve normally in engagement with one of said seats to control said passage, said valve having a tubular stem operatively supported in said casing and extending outwardly of said passage, a second valve normally in engagement with the other of said seats and also controlling said passage, said second valve having a stem operatively supported in the tubular stem of said first mentioned valve, said valves being spaced apart when seated and adapted to be engaged one with the other and close said space in the operation of opening said valves, and means operatively connected to one of said stems to open said valves, said tubular stem communicating at one end with the space between said valves and opening outwardly of said passage at its other end.

In testimony whereof, I have hereunto affixed my signature.

JOSEPH H. GODFREY.